United States Patent [19]

Shea et al.

[11] Patent Number: 5,787,584
[45] Date of Patent: Aug. 4, 1998

[54] CATALYTIC CONVERTER

[75] Inventors: Michael Richard Shea, Grand Blanc; Robert Anthony Lawrence, Flushing; Eric Hans Andersen, Grand Blanc, all of Mich.

[73] Assignee: General Motors Corporation, Detroit, Mich.

[21] Appl. No.: 694,381

[22] Filed: Aug. 8, 1996

[51] Int. Cl.⁶ .................. H01R 43/00; B23P 19/00; B01D 50/00; F01N 3/08
[52] U.S. Cl. .................. 29/890; 29/428; 29/429; 29/800; 422/177; 422/179; 422/180
[58] Field of Search .................. 422/179, 177, 422/180, 176; 60/299; 29/428, 429, 800, 890

[56] References Cited

U.S. PATENT DOCUMENTS

| | | | |
|---|---|---|---|
| 4,142,864 | 3/1979 | Rosynsky et al. | 422/179 |
| 4,775,518 | 10/1988 | Abthoff, et al. | 422/179 |
| 4,969,264 | 11/1990 | Dryer et al. | 29/890 |
| 5,094,072 | 3/1992 | Ampferer et al. | 60/290 |
| 5,293,743 | 3/1994 | Usleman et al. | 60/299 |
| 5,345,162 | 9/1994 | Shiojima | 320/21 |
| 5,346,675 | 9/1994 | Usui et al. | 422/180 |
| 5,380,501 | 1/1995 | Hitachi et al. | 422/180 |
| 5,385,017 | 1/1995 | Harada | 60/284 |
| 5,387,399 | 2/1995 | Nishida et al. | 422/171 |
| 5,396,767 | 3/1995 | Suzuki | 60/298 |
| 5,419,878 | 5/1995 | Honma | 422/177 |
| 5,436,216 | 7/1995 | Toyao et al. | 502/439 |

*Primary Examiner*—Ponnathapura Achutamurthy
*Assistant Examiner*—Brett Nelson
*Attorney, Agent, or Firm*—Anthony Luke Simon

[57] ABSTRACT

A catalytic converter structure comprising: cylindrical catalyst substrate; a first cylindrical tube covering a first end of the substrate; a second cylindrical tube covering a second end of the substrate; a support mat surrounding a central portion of the substrate and portions of the first and second cylindrical tubes; and a housing having a cylindrical shape, within which the substrate, first and second cylindrical tubes and the support mat are located, wherein the housing has a central body and first and second housing ends, wherein the housing ends each have a first diameter less than a second diameter of the central body, wherein the first and second housing ends engage the first and second cylindrical tubes, respectively. The structure requires few components, is easy to tool and easy to adapt to different engine implementations.

1 Claim, 3 Drawing Sheets

CATALYTIC CONVERTER

This invention relates to a catalytic converter.

BACKGROUND OF THE INVENTION

Many catalytic converter structures known to those skilled in the art use a clam-shell design in which two halves of the converter housing are welded together to contain the catalyst coated substrate and other internal components. Such catalytic converters have circular, oval or rectangular cylindrical shapes. Other catalytic converters have been constructed with circular cylindrical bodies and conical ends formed through complex processes or through welding of conical end cones onto the cylindrical body.

SUMMARY OF THE PRESENT INVENTION

Advantageously, this invention provides a catalytic converter structure requiring very few parts and that is very easy to assemble.

Advantageously, according to this invention, a catalytic converter structure is provided that requires no welding and no costly forming processes.

Advantageously, this invention provides a catalytic converter structure easily adapted to various vehicle implementations requiring low tooling investment and low assembly costs.

Advantageously, according to a preferred example, this invention provides a catalytic converter structure comprising: a cylindrical catalyst substrate; a first cylindrical tube covering a first end of the substrate; a second cylindrical tube covering a second end of the substrate; a support mat surrounding a central portion of the catalyst substrate; and a housing having a cylindrical shape, within which the substrate, first and second cylindrical tubes and the support mat are located, wherein the housing has a central body and first and second housing ends, wherein the housing ends each have a first diameter less than a second diameter of the housing body, wherein the first and second housing ends engage the first and second cylindrical tubes, respectively.

BRIEF DESCRIPTION OF THE DRAWINGS

The present invention will now be described by way of example with reference to FIGS. 1–5, which illustrate steps of formation of an example catalytic converter according to this invention.

DETAILED DESCRIPTION OF THE INVENTION

Figure 1:
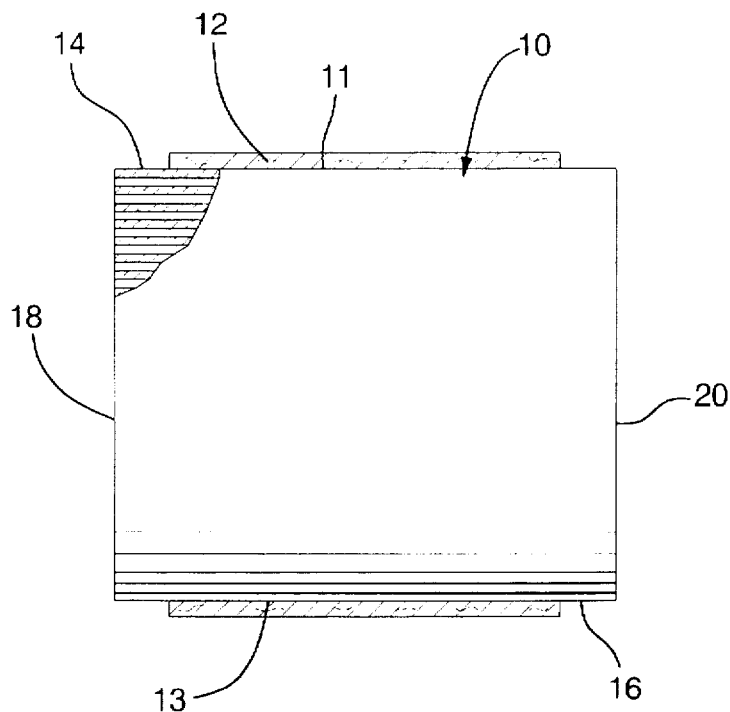

Referring now to FIG. 1, the first step of an example assembly of a catalytic converter structure according to this invention is shown. A catalyst coated substrate 10 has a circular cylindrical shape and first and second axial ends 18 and 20. A support mat 12 is wrapped around a central portion 13 of the periphery 11 of catalyst substrate 10. The portions 14, 16 of the substrate periphery 11 proximate to axial ends 18 and 20 are left uncovered by support mat 12.

The support mat 12 may, for example, comprise a 4.9 mm thick intumescent mat material of a type known and available to those skilled in the art for supporting and insulating converter catalyst substrates such as substrate 10. The support mat 12 is a pliable material and can be wrapped around the substrate and maintained in place by any suitable method, for example, with adhesive tape, which is later burned off during normal operation of the catalytic converter when installed in a motor vehicle.

Figure 2:
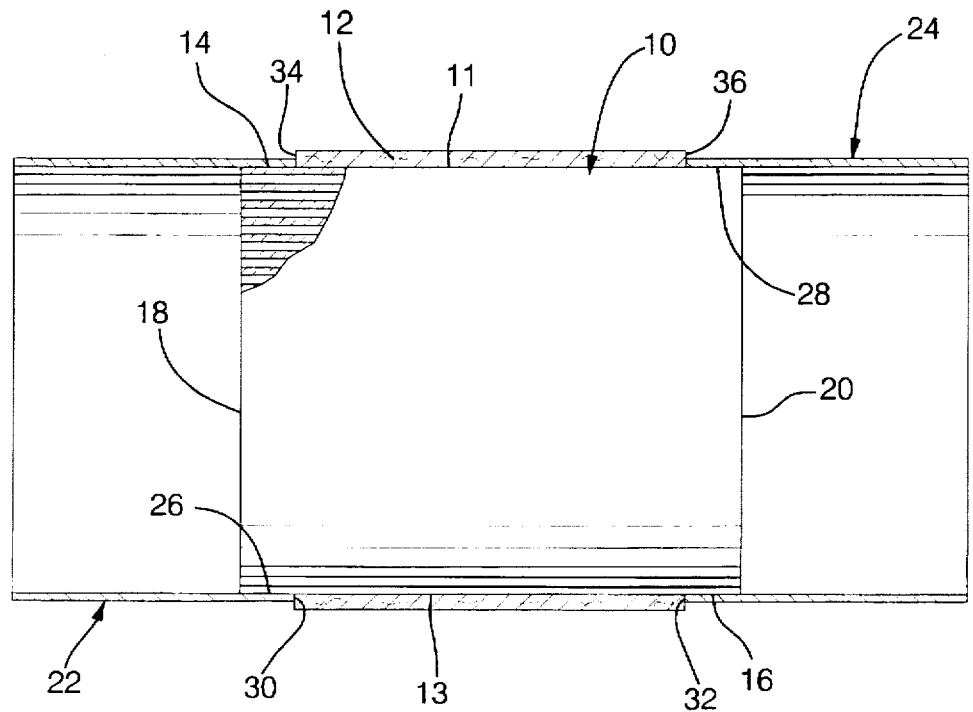

Referring now to FIG. 2, first and second metal end tubes 22 and 24 are slid over the peripheral end portions 14 and 16 of the catalyst substrate 10 so that each end tube 22, 24 is fitted to the substrate 10 and projects out therefrom. End tube 22 has an axial end 30 abutting against the annular axial end 34 of the support mat 12 and end tube 24 has an axial end 32 abutting against the annular axial end 36 of the support mat 12. The end tubes 22 and 24 each have a circular cylindrical shape with a constant diameter over the entire axial length. Each tube 22, 24 may, for example, comprise 1.45 mm thick 409 stainless steel, have an 80 mm inner diameter and an axial length of 50 mm. The 80 mm inner diameter is no less than the maximum outer diameter of the catalyst substrate 10 and may provide a small gap between the outer diameter of the substrate (i.e., 76.2 mm) and the inner diameter of the tubes 22, 24.

Figure 3:
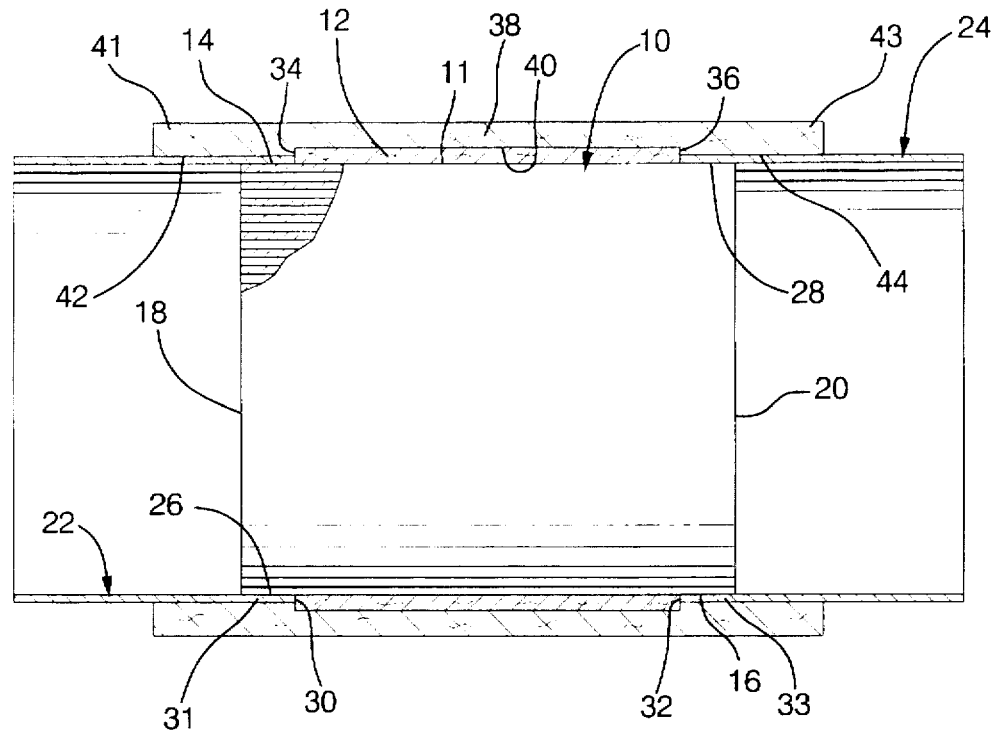

Referring now to FIG. 3, a second support mat 38, i.e., 6 mm thick, of the same material as support mat 12, is added to the assembly by wrapping it around the first support mat 12 and the axial inner ends 26, 28 of end tubes 22 and 24. The support mat 38 thus forms an annular cylindrical support and insulation structure with its radially inner surface 40 engaging the outer surface of mat 12. Support mat 38 has radially inner portions 42 and 44 proximate to its axial ends 41 and 43 engaging the outer periphery of the axially inner ends 31 and 33 of the end tubes 22 and 24.

While the second support mat 38 is shown covering the inner ends 31, 33 of end tubes 22, 24, the support mat 38 may alternatively be of the same length as inner support mat 12, in which case support mat 38 does not cover ends 31, 33 of end tubes 22, 24. This alternative configuration provides "air gap" insulation of the inner axial ends of end cones 22, 24.

Figure 4:
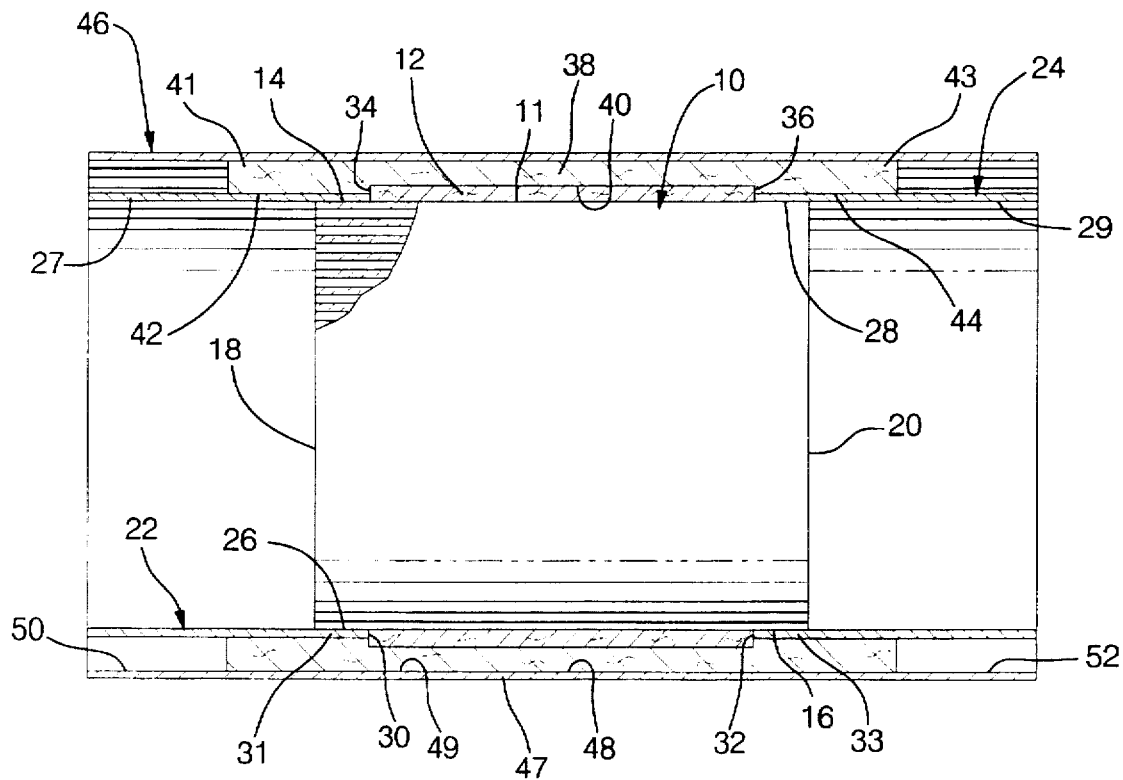

Referring now to FIG. 4, the entire assembly including the catalyst substrate 10, first support mat 12, second support mat 38 and first and second end tubes 22 and 24 is slid within circular cylindrical metal tube (housing) 46. The housing 46 may, for example, comprise 1.45 mm thick 409 stainless steel and have an inner diameter of 90.6 mm along its entire axial length, to snugly fit with the outer surface of the outer support mat 38.

In the example shown, the housing 46 is axially co-extensive with the assembly of the substrate 10 and the first and second end tubes 22 and 24. Central portion 48 of the inner periphery 49 of housing 46 snugly engages the support mat 38. First and second axial ends 50, 52 of the housing 46 extend out over the ends 27, 29 of the end tubes 22 and 24 not covered by the support mat 38.

Figure 5:
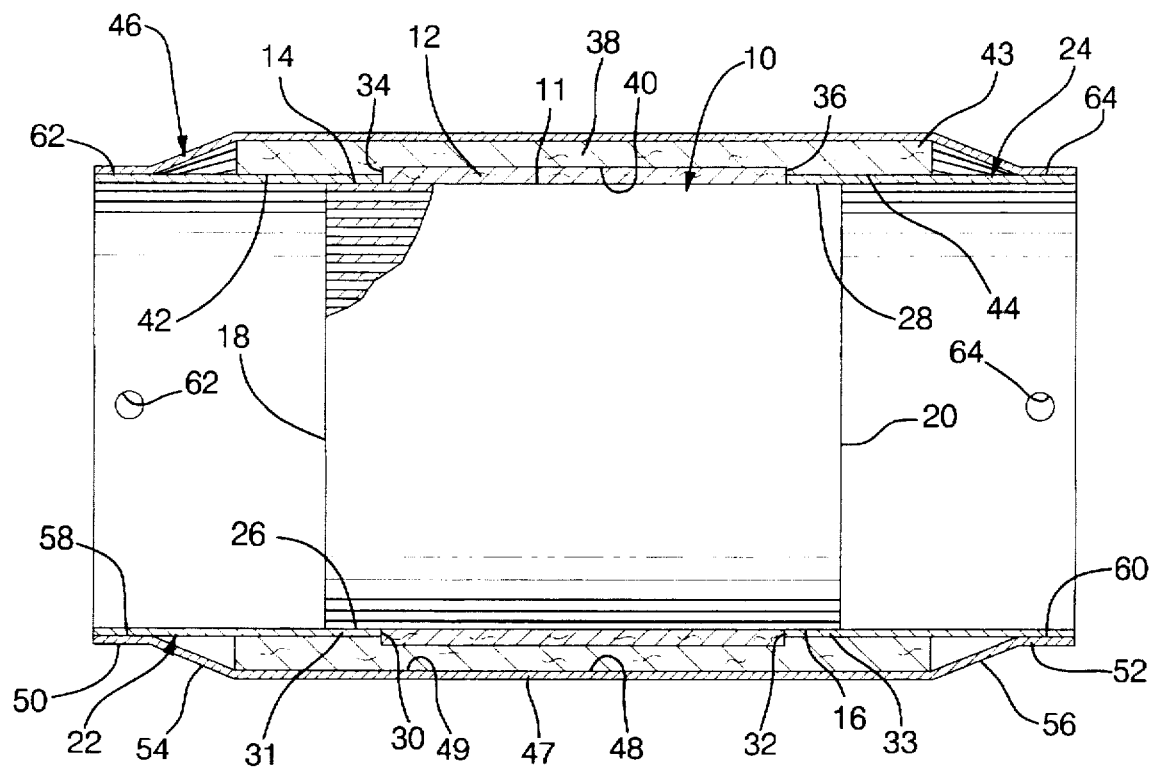

Referring now to FIG. 5, the ends 50 and 52 of the housing 46 are sized resulting in conical sections 54 and 56 leading to the ends 50 and 52 now having a reduced diameter compared to that of the central portion 47 of the housing 46. The sizing operation may be any known tube sizing operation using equipment known and available to those skilled in the art.

One example tube sizing machine available to those skilled in the art has an inner set of fingers that expand to hold the inner surface of the end tube 22 (or 24). Another set of outer fingers forms an annular ring that fits around the outer diameter of the housing 46 at the end 50, 52 being sized. The diameter of the annular ring formed by the outer fingers is reduced by the machine, reducing the outer diameter of the end 50, 52 until the end 50, 52 achieves the shape shown in FIG. 5. Preferably, the inner peripheral surfaces 58 and 60 of the end portions 50 and 52 engage the outer peripheral surfaces 62 and 64 of the outer axial ends 27, 29 of the end tubes 22 and 24 as shown.

Thus is shown a complete catalytic converter structure that can be welded to exhaust pipes in a known manner or fitted with exhaust pipe connecting brackets of a known type. As described herein, the structure shown in FIG. 5 is achieved without any welding, eliminating expensive welding operations and associated product characteristics from the construction of the catalytic converter. If the structure shown in FIG. 5 is to be shipped or otherwise extensively handled before assembly with brackets and/or to other exhaust pipes, dimples 62 and 64 may be placed in the end tubes 22 and 24 where they engage the ends 50 and 52 of the outer cylindrical tube 46. The dimples 62, 64 mechanically secure the structure together, making the structure more amenable to extensive operator handling and/or shipping between assembly locations.

We claim:

1. A method of manufacturing a catalytic converter comprising the steps of:

wrapping a first support mat section around a central portion of an outer cylindrical surface of a catalyst substrate, leaving first and second axial end portions of the outer cylindrical surface uncovered;

first sliding a first cylindrical tube on the first axial end portion, wherein the first cylindrical tube has one first tube end that abuts the first support mat section and another first tube end that extends axially beyond the first axial end portion free of the catalyst substrate;

second sliding a second cylindrical tube on the second axial end portion, wherein the second cylindrical tube has one second tube end that abuts the first support mat section and another second tube end that extends axially beyond the second axial end portion free of the catalyst substrate;

wrapping a second support mat section around and in direct contact with the first support mat section and the first and second tube ends that abut the first support mat section;

third sliding the substrate with the first and second support mat sections and the first and second cylindrical tubes within a third cylindrical tube, wherein the third cylindrical tube has a constant size over an entire axial length thereof and has an inner periphery spaced radially outwardly from the first and second cylindrical tubes; and after the third sliding step, sizing down first and second outer ends of the third cylindrical tube to reduce first and second diameters thereof, wherein the first outer end engages a first outer periphery of the first tube end that extends axially beyond the first axial end portion and the second outer end engages a second outer periphery of the second tube end that extends axially beyond the second axial end portion.

* * * * *